United States Statutory Invention Registration [19]

[11] Reg. Number: H414

Young et al.

[43] Published: Jan. 5, 1988

[54] SURFACE IONIZATION SOURCE

[75] Inventors: Steven E. Young, Mountain View; Sidney E. Buttrill, Jr., Palo Alto, both of Calif.

[73] Assignee: The United States of America as represented by the Secretary of the Army, Washington, D.C.

[21] Appl. No.: 28,168

[22] Filed: Mar. 20, 1987

[51] Int. Cl.[4] ..... H01J 27/00; H01J 7/24

[52] U.S. Cl. ..... 250/423 R; 315/111.81

*Primary Examiner*—Stephen C. Buczinski
*Assistant Examiner*—Linda J. Wallace
*Attorney, Agent, or Firm*—Anthony T. Lane, Jr.; Harold H. Card, Jr.; Michael C. Sachs

[57] ABSTRACT

An ionization source comprises a housing defining a space, a wire extending to the space, a temperature control connected to the wire and an alkali metal glass bead attached to the wire to be heated by the temperature control. An ion extraction plate with an orifice therein covers the space and is insulated from the housing by an insulating ring. The housing includes a port for drawing a vacuum from the space and for leaking molecules into the space which are to form quasi ions on the glass bead. A focusing plate may also be provided over the extraction plate with an aperture lying on an ion axis which also extends through the orifice for the focusing of the ion beam.

5 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SURFACE IONIZATION SOURCE

STATEMENT OF GOVERNMENT INTEREST

The invention described herein may be manufactured, used and licensed by or for the Government for Governmental purposes without the payment to us of any royalties thereon.

FIELD AND BACKGROUND OF THE INVENTION

The present invention relates in general to the field of ion generation and in particular to a new and useful surface ionization source which is capable of converting neutral molecules into ions containing the molecules.

Many ways are already known for producing gas phase ions for analysis by mass spectrometry. The most commonly used of these methods are electron impact, in which a beam of energetic (typically 70 electron volts) electrons is passed through a low pressure (less than $10^{-4}$ torr) of vaporized sample. This was the earliest and is still the most widely used method of forming ions in commerically produced mass spectrometers. Typically, the electron impact ionization results in the formation of a large number of fragment ions and in many cases does not produce a significant abundance of intact molecular ions. The molecular ions are useful because they provide information on the molecular weight of of the sample molecules.

The more recent innovation of chemical ionization forms ions by means of a gas phase chemical reaction between ions produced from a reagent gas, present in large excess, and the neutral sample molecules. These ions are typically the sample molecule plus one proton, and the molecular weight of the original sample can be easily deduced by subtracting the mass of a proton, namely, 1.0007825, from the measured mass of the MH+ ion.

Many other methods of ionization exist but are less commonly used. Among these are ionization by vacuum ultraviolet photons, termed photoionization; ionization by very high electric fields, termed field ionization; and ionization by bombardment of the sample upon a solid surface with high energy beams of either ionic or neutral particles.

Mass spectrometers are useful in detecting contaminants in the air. One such application is in the field of chemical warfare where it is desired to determine whether a chemical is present on a battlefield. The application of mass spectroscopy however is complicated in the environment of a battlefield which would be expected to contain other substances that would not normally be found in clean air.

A man-portable field alarm system for chemical agents based on the principle of tandem mass spectrometry or mass spectrometry/mass spectrometry (MS/MS) would be very useful if such a device could be constructed. Such man-portable field alarm systems would be required to detect trace levels of chemical agents in the presence of large concentrations of complex interfering substances, such as diesel fuel smoke. Based on the results of several space exploration programs, a single, small, compact, man-portable, battery-operated mass spectrometer system could easily be produced that is capable of detecting trace levels of chemical agents in clean air. However, to detect chemical agents in the presence in high concentrations of interfering mixtures, a more sophisticated MS/MS system is required.

In an MS/MS detector, the first mass spectrometer separates all ions corresponding to the molecular weight of the chemical agent from the large variety of ions produced from the total mixture of substances in the air. A particular mass-selected ion beam is then fragmented, and the fragment ions separated according to their mass by the second mass spectrometer. Because chemical agents have fragmentation patterns different from those of common interfering substances, the presence of fragment ions characteristic of chemical agents can be used to detect their presence, even in complex mixtures.

Limitations to the portability of mass spectrometers are size, weight, and power consumption. An examination of commercially available, small mass spectrometers, which are principally residual gas analyzers, shows that by far the largest single limiting factor is power consumption—specifically the vacuum system and its associated pumps. Conventional vacuum pumps use two separate stages of pumping to maintain a vacuum against the ambient atmosphere. The first stage is either a diffusion pump or a turbomolecular pump. This in turn is backed in the second stage by a mechanical vacuum pump, usually called a forepump. Even if the newer miniature turbomolecular pumps are used, which are lightweight and low in power consumption, the smallest available mechanical pump will push the power requirement for the vacuum pumps alone to well over 500 watts. Even if the weight of these items could be tolerated, 500 watts is well outside the capabilities of any man-portable battery pack.

An alternative vacuum pump, called a triode pump, ionizes gas by a continuous DC discharge. Pumping occurs by the burial of ions in a titanium cathode as well as by chemical reactions of neutral gas molecules with sputtered titanium metal. In operation, the power consumed by these pumps is well under 1 watt (this is as long as the gas load remains small; otherwise power would be 10 to 40 W); the major determinant of their power consumption is thus the efficiency of their required high-voltage power supply. Furthermore, once started, these pumps do not require backing by a mechanical forepump.

In use, the entire vacuum system, including the triode pump, is evacuated, baked and then sealed off. As long as the gas load on the vacuum system stays within the capacity rating of the triode pump, these devices can maintain a high vacuum without any mechanical pump requirements. Small triode pumps suitable for a portable mass spectrometer system have pumping speeds of 1–5 l/s and throughputs at low power consumption of up to about $10^{-4}$ Torr l/s. The limited pumping capacity available means that ionization methods such as chemical ionization (CI) (not necessarily true in the case of the Finnigan Ion trap however), and atmospheric pressure ionization (API), both of which introduce large gas loads, would not be feasible for a man-portable mass spectrometer system. Commercially available systems would therefore not be practical for the portable field alarm detector.

SUMMARY OF THE INVENTION

The present invention provides a new means for producing gas phase ions for subsequent analysis by mass spectrometry or other methods. This new source of ions is extremely simple to construction, very inexpensive to produce, and is inherenty rugged. This invention is based upon the fact that many materials have ionic species naturally present in substantial concentrations on their surfaces. When neutral molecules are caused to collide with such surfaces, they may form complexes on the surface with the previously existing ionic species. At appropriate temperatures, the complex between these ionic species and the neutral molecule will evaporate from the surface as a gas phase ionic complex. For example, molecules of acetone, which have a molecular formula of $C_3H_6O$, colliding with a surface containing a high concentration of potassium cations, K+, are converted into ions with the formula $C_3H_6OK+$, and would appear in the mass spectrum at a mass equal to the sum of the molecular weight of acetone (58) and the atomic weight of potassium (39), that is 58+⇄=97.

The present invention is particularly suited as an ion source for a mass-portable field alarm system. The alarm system incorporating the present invention can be referred to as a surface ionization mass spectrometer/-mass spectrometer or SIMS/S. Further work has been shown that organic alkali complexes produced by the surface ionization source produce only an alkali ion when they undergo either collision induced dissociation or surface induced dissociation. As a result, there is no characteristic spectra produced for the second mass analyser to scan.

$$\text{i.e: } [\text{DIMP} + \text{K}]^+ \xrightarrow[\text{CID}]{} \underset{\text{neutral}}{\text{DIMP}} + \text{K}^+ \text{ (not diagnostically useful)}$$

$$\text{NOT: } [\text{DIMP} + \text{K}]^+ \xrightarrow[\text{CID}]{} \text{DIMP} + \text{fragments} + \underset{\text{neutral}}{\text{K}}$$

The simple surface ionization source of the invention has been constructed and tested. The source comprising the following parts:

A surface ionization element, which is, for example, a piece of 0.005 inch diameter irridium wire bent into the shape of a hair pin. A small bead of potassium or sodium glass is supported at the bend in the hair pin. The temperature of the glass bead is controlled by varying an electrical current passed through the irridium wire.

A source body or housing which serves to confine the sample molecules in the vicinity of the surface ionization element.

An ion drawout plate, which provides a means of conveying the ions formed on the surface ionization element to the mass spectrometer.

An insulating ceramic ring which allows a difference in electrical potential to be maintained between the source housing and the ion drawout or extraction plate. A focus electrode can also be provided to produce appropriate electrical fields for focusing the resulting ion flux into a nearly parallel beam.

The inventive source has been tested with ketones, aromatic hydrocarbons, alkylphosphonates and olefins. In all cases the only ion formed is the complex between the neutral molecule and the potassium ion.

It has been well known for many years that certain substances are spontaneously converted into ions upon hitting a hot filament in a vacuum. For example, if a beam of neutral potassium atoms strikes a hot filament of tungsten, iridium, or other metal with high work function, a significant portion of the incident atoms are converted to positive ions. This phenomenon has been termed surface ionization.

In contrast to earlier surface ionization devices, however, the present inventions converts incident neutral molecules into ions through a complexation with ions previously existing on the surface of the ionization element. The ionic species formed is not simply the incident particle with one electron removed. It is therefore a qualitatively different process from the earlier surface ionization method, and has a much broader range of applicability, since it is expected to be capable of producing molecular complex type ions from almost all chemical compounds.

The examples produced to date of the surface ionization element consists of various glasses which are heated by means of passing an electrical current through their supporting filament structure. These are only specific examples of possible surface ionization elements. Any material which can have ionic species present on its surface can be used in principle as a surface ionization element in this invention. The material is not limited to glasses but could be materials such as polycrystalline ceramics, metal alloys, or even appropriate high temperature stable polymers. Any appropriate means may be used to control the temperature of the surface ionization element. The temperature at which the maximum yield of ions is obtained from a particular molecule can be expected to vary with the composition of the surface ionization element.

It is not intended to limit this invention to the production of ions for mass spectrometry. In this specific application the ions are separated according to their mass in a mass spectrometer which is used as a means of characterizing the sample molecules. Other methods for detecting the ions formed by this invention need not employ any form of mass analysis. The ion current might be detected with a simple electrometer circuit, or specific ions might be detected by other means, such as laser induced fluorescence.

Accordingly an object of the present invention is to provide a surface ionization source which comprises a surface ionization element made at least partly of a material which has ionic species present on its surface, temperature control means connected to the surface ionization element for controlling the temperature thereof to produce high yields of ions of particles of a target molecule which strikes the surface, a source housing defining a space at least partly surrounding the element for confining ions therein, the housing having a vacuum port for drawing a vacuum from the port, an ion extraction plate engaged with the housing for closing the space, the extraction plate having an orifice through which a stream of ions can pass and insulating means between the housing and the extraction plate for electrical insulation therebetween.

A further object of the invention is to provide a surface ionization source which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
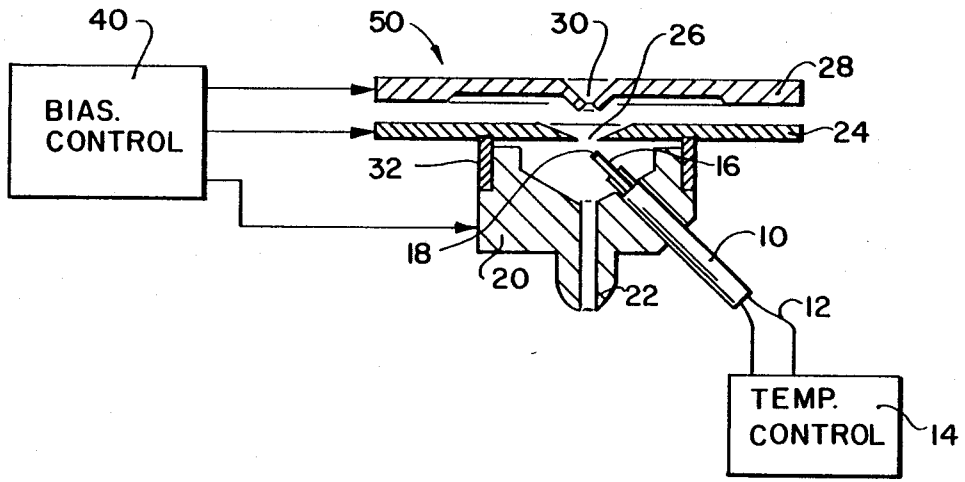
FIG. 1 is a sectional view showing the surface ionization source of the present invention.

Referring to the drawings in particular, the invention embodied in FIG. 1 comprises an active surface ionization source generally designated 50. Such a source can be useful in a mass spectrometer arrangement as shown in FIG. 3.

Figure 3:
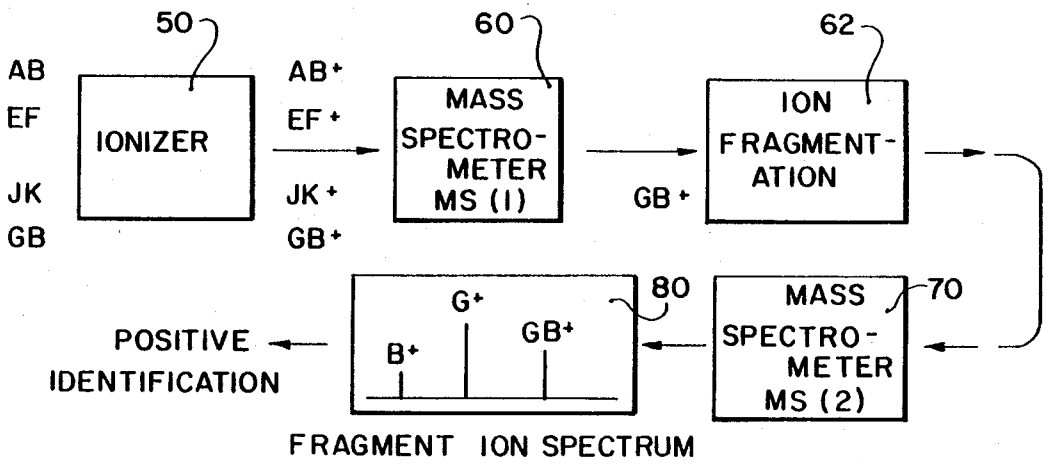
FIG. 3 is a block diagram showing the use of the inventive ionization source in a dual mass spectrometer arrangement.

FIG. 3 shows the general concept of a proposed chemical alarm system based on the inventive ionization mass source and a mass spectrometry. The ionization source 50 converts the molecules of chemicals present in the air into ions. These ions are separated according to their mass by the first mass spectrometer 60, labeled MS(1). A particular mass-selected ion is transmitted to the next stage 62 of the device, where it is broken into fragments. The second mass spectrometer 70, labeled MS(2), separates the fragments according to their mass and produces a fragment ion spectrum 80 or pattern characteristic of the original molecule. Thus, MS(1) separates the various chemicals entering the device after they are converted into molecular ions; ion fragmentation and MS(2) characterize and identify individual chemicals. For highly specific detection of a particular compound, ions of the correct molecular weight are fragmented, and MS(2) is set to monitor a chemically characteristic fragment of that compound. This works fine for EI and FI but not with this source.

Figure 2:
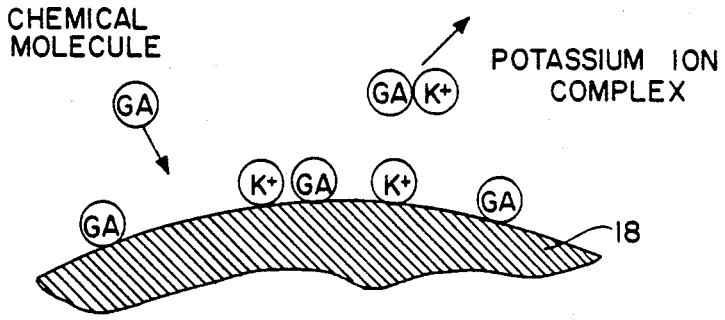
FIG. 2 is a greatly enlarged partial sectional view of an ionization element used in accordance with the invention, illustrating the operating principle of the invention.

As shown in FIG. 2, gas phase molecules of the target agent simulants GA impinge upon the surface of potassium glass bead 18, that is rich in alkali cations, shown as K+. On the surface, complexes form between these cations and the neutral molecules. These complexes are subsequently desorbed from the high-temperature (800°-1000° C.) surface.

As shown in FIG. 1, the active surface ionization element 10 has a 1-mm-diameter bead 18 of alkali metal glass located at the bend in a hairpin 16 of 0.005-inch-diameter iridium wire. When this bead is heated by passing an electrical current through the wire, large quantities of alkali metal ions evolve. These ions are removed from the interior of the ion source by the drawout plate 24 and focused by a focuselectrode or plate 28 for subsequent analysis by MS(1). When vapors of various chemical compounds are introduced into the ion source, additional ions are seen at the masses corresponding to complexes between the alkali cation and the neutral molecule. Housing 20 and plates 24, 28 are biased by electrical biasing control 40 to form an ion beam on a beam axis passing through openings 26 and 30, and to focus that beam.

Figure 4:
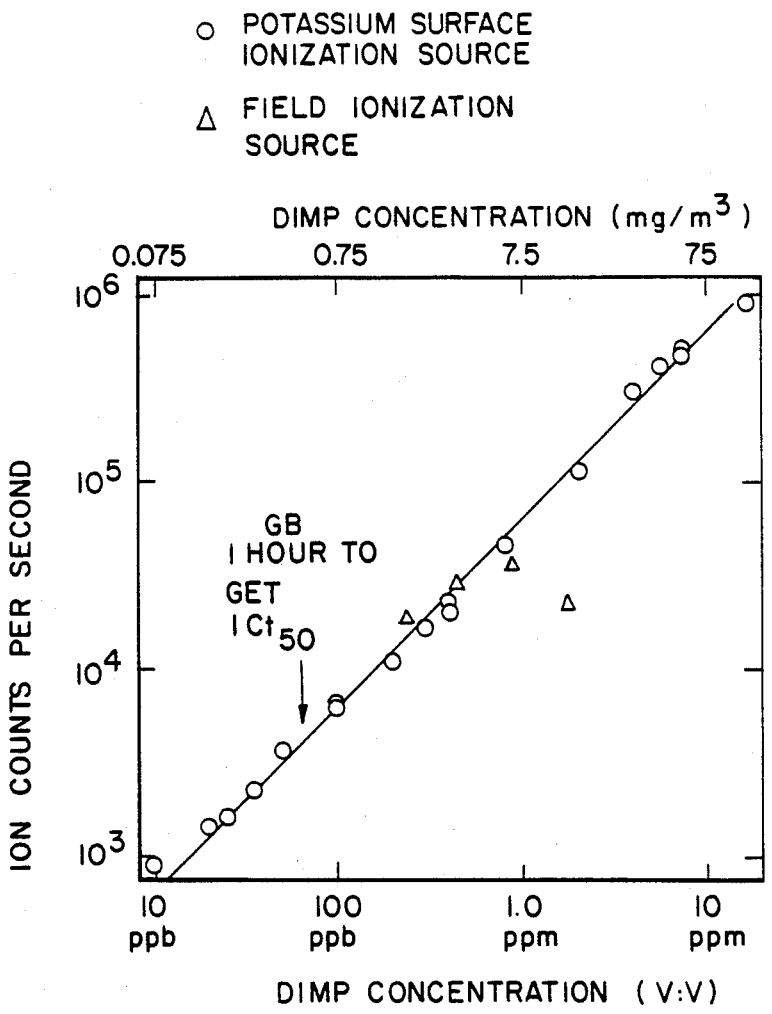
FIG. 4 is a graph showing concentration of a known chemical agent (DIMP) plotted against ion counts generated by the ion source of the present invention and also another ion source which was used in determining the advantages of the present invention.
Figure 5:
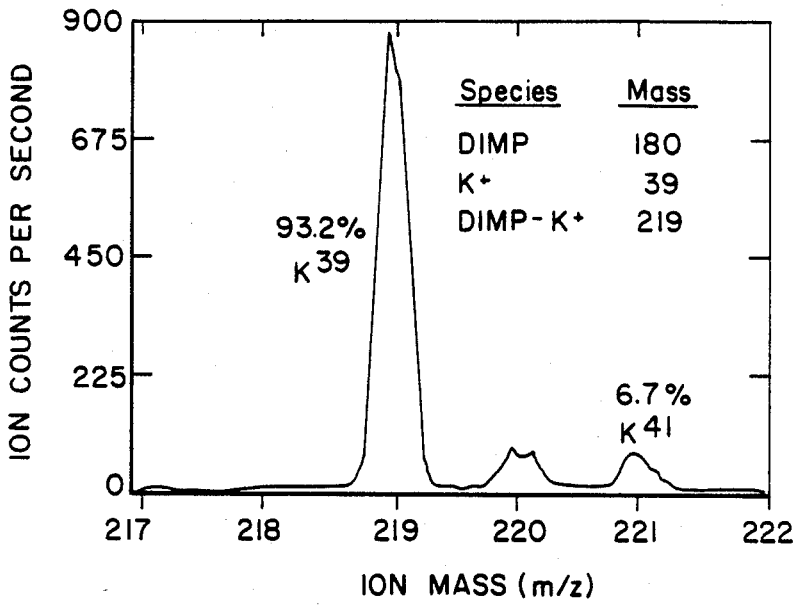
FIG. 5 is a graph showing the DIMP quasi-molecular ion spectrum obtained using a laboratory size MS/MS system.

FIG. 4 shows the sensitivity of a potassium glass surface ionization source for DIMP. FIG. 4 also shows four points (triangles) corresponding to the detection of DIMP by a volcano-style field ionization source (not shown). At concentrations above 1.0 ppm, the field ionization source rapidly loses sensitivity. In contrast, the surface ionization source is linear in response over three orders of magnitude of DIMP concentration. The lower limit of detection in this case is determined by the range of the device used for generating known concentrations of DIMP vapor in air. FIG. 5 shows the quality of the DIMP quasimolecular ion spectrum obtained using the large laboratory version of the MS/MS system operating with the quadrupole MS(1) set to transmit all ions. The excellent signal-to-noise and good mass resolution show that the DIMP spectrum could easily be detected at much lower DIMP concentration in air.

The exact mode of formation of the complexes between the alkali metal ions and neutral molecules as shown in FIG. 2 is not well established. To obtain additional information about this mechanism, a glass bead ionizer (not shown) was constructed in which a miniature thermocouple was spot welded to the irridium wire hairpin 16 at exactly the point at which the alkali metal glass bead 18 was attached. This arrangement allowed the inventors to monitor the ion current as a function of the temperature. Plotting the natural logarithm of the ion signal versus one over the absolute temperature of the bead allowed the inventors to obtain, in the usual way, the activation enthalpy for the formation of the ionic species observed. For a sodium glass, which produces Na+ ions, the activation enthalpy was between 81 and 85 kcal/mole. This was true for the production of the sodium ion alone or the sodium ion complex with either benzofuran or bis-2-chloroethyl ether. Because the activation energies are so similar, it was impossible to distinguish between the process that forms the alkali metal complex ion on the surface and one in which the alkali metal complex ion forms in the gas phase.

Some compounds however clearly do react on the surface of the glass bead. The major product ion observed when adding benzylchloride to the ion source was at m/z 91, corresponding to the benzyl cation. Apparently a chloride is extracted from the benzylchloride to produce this benzyl cation. The activation enthalpy we observed for the overall process for forming m/z 91 was about 48 kcal/mole. Similarly when we added chloroethylethyl sulfide (half mustard) to the sodium glass bead ion source, the only product ion we observed was at m/z 89, again corresponding to abstraction of a chloride from the molecule. We measured the activation enthalpy for this process at approximately 50 kal/mole, substantially different from that for the formation of the sodium cation and its complexes. The formation of these chloride extraction ions must therefore be occurring on the surface of the hot glass bead.

Figure 6:
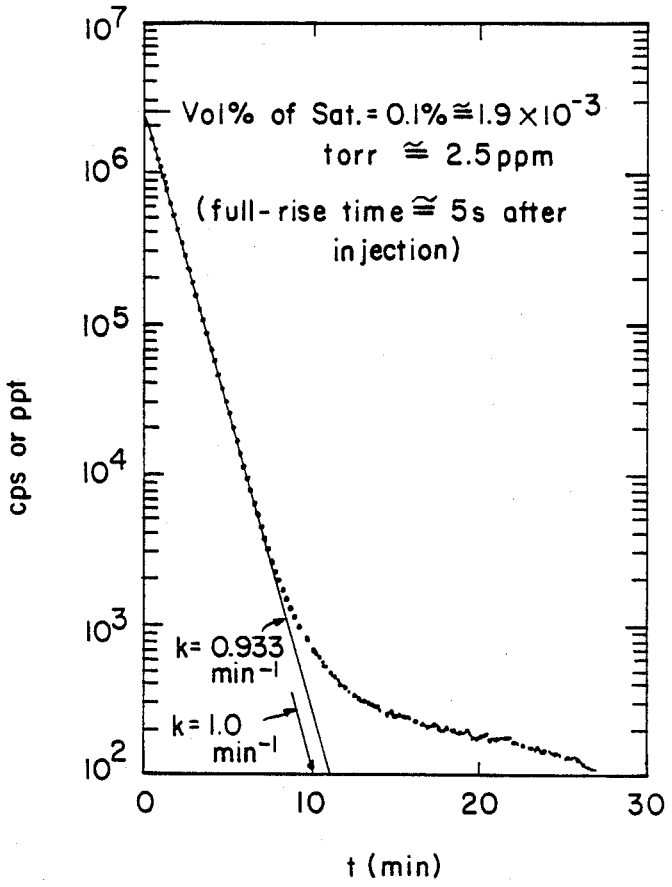
FIG. 6 is a graph showing the sensitivity of a surface ionization source as shown in FIG. 2 where a sodium glass bead is used for half mustard.

FIG. 6 shows the sensitivity of detection of a sodium glass bead surface ionization source for half mustard when the chloride abstraction product ion was monitored at m/z 89. Air saturated with half mustard vapor was injected into an exponential dilution flask to produce an initial concentration of half mustard of 2.5 ppm. A flow of 1 L/min of clean air through the bulb this flask produced an exponential dilution of the half mustard vapor in the air exiting the bulb and blowing over the air inlet system of the laboratory MS/MS system. The quadrupole MS(1) (FIG. 3) was operated in the rf-only mode to allow transmission of all ions, and MS(2) was set to monitor the product ion at m/z 89. The response of the ion source and mass spectrometer system was linear in half mustard concentration over almost four orders of magnitude. At half mustard concentrations below 1 ppb, the inventors observed substantial tailing of the decay curve, caused by adsorption of the half mustard on the surfaces of the vapor generation apparatus.

The alkali metal glass surface ionization source has been sufficiently tested at this point to demonstrate that it is a viable alternative to field ionization for use in a portable mass spectrometer system.

It is noted that thermonic emitters consisting of alkali-doped glasses have been used recently for chemical ionization of organic samples. See B. Ackerman et al., Proc. 3lst Annual Conference on Mass Spectrometry and Allied Topics, Boston, May 1983; pp. 600–601; and D. Bombick, J. D. Pinkston, J. Allison, *Anal. Chem.* 1984, 56, 396–402. Source pressures in the range of 20 to 700 millitorr are typical, requiring an instrument with differential pumping. It is possible to obtain reasonable ion signals at lower sample pressures with the bead functioning as a surface ionization source.

An organic-alkali surface ionization source like the one shown in FIG. 1 has been constructed and evaluated using an alkali glass bead of the type $R_2O:Al_2O_3:SiO_2$ in a 1:1:2 molar ratio mounted on the irridium heater wire with the bead centered on the ion axis. Mass analysis was done on the MS/MS previously described. Vapors of the samples in air or $N_2$ were introduced into the source through a membrane separator kept at 100° C. or directly by means of a variable leak at port 22. Source pressures varied from $8\times10^{-7}$ torr to $8\times10^{-3}$ torr. When the glass bead was heated to 800° to 1000° C. by temperature control 14, organic-alkali ions of the formula $[M+X]^+$ were seen in addition to large currents of the alkali itself, where X=Li, Na, K, Rb, or Cs. At higher temperatures, the intensity of the organic-alkali complex dropped sharply while the alkali ion intensity increased further, indicating a surface effect rather than chemical ionization. This drop in ion current at higher temperatures has also been observed for surface ionization of simple organics on hot metal wires. However, if an irridium wire without a bead is used, no ions are seen unless it is heated sufficiently to emit electrons, resulting in an EI spectrum.

Polar or polarizable compounds seem to complex most easily with the order: ketones, ethers, alcohols>alkenes>simple aromatics>alkanes. The order for complexing with simple aromatics and alkanes was observed to be Li>Na>K>Rb. For more polar compounds, Na and K glasses work well; pyrex glass also works, giving predominantly Na ion adducts.

Some compounds, such as 2-chloro ethyl-ethyl sulfide and benzyl chloride undergo abstraction to form ions with no addition of alkali. Benzyl alcohol produces both a $[M+Na]^+$ at m/z 131 and a loss of OH to produce m/z 91. CID with argon on m/z 131 produces only m/z 23 (Na), while CID on m/z 91 results in a fragmentation spectrum similar to toluene. Most $[M+Na]^+$ or $[M+K]^+$ yield only $Na^+$ or $K^+$ with CID, hence this technique is not useful for MS/Ms. For one series of experiments, note above, the sodium glass bead with a thermocouple imbedded in the glass was used to directly read the bead temperature. With this technique it is possible to determine the heat of formation for alkali ions and alkali-orqanic complexes by using the Arrhenius equation:

$$\ln k_2 - \ln k_1 = \frac{-\Delta H_f^\circ}{R}\left(\frac{1}{T_2} - \frac{1}{T_1}\right)$$

where T is the temperature in °K, R equals 1.987 cal $mol^{-1}$, and k is the ion count rate. Table 1 lists the heats of formation for several ions obtained in this manner.

While a specific embodiment of the invention has been shown and described in detail to illustrate the application of the principles of the invention, it will be understood that the invention may be embodied otherwise without departing from such principles.

What is claimed is:

1. A surface ionization source comprising:
a source housing defining an ion space;
a support wire extending into said space;
temperature control means connected to said wire for heating said wire;
an alkali metal glass bead connected to said wire to be heated to form ions of molecules in said space;
an ion extraction plate engaged to said housing and insulated from said housing, said extraction plate closing said space and having a beam orifice therein for the passage therethrough of an ion beam from said space; and
biasing means connected to said housing and said extraction plate for forming a beam on a beam axis extending through said orifice.

2. A surface ionization source according to claim 1 wherein said glass bead includes one of sodium or potassium.

3. A surface ionization source according to claim 1 including a focusing plate engaged over said extraction plate and having an aperture therein lying on said beam axis, said focusing plate being connected to said biasing means for focusing the beam of ions on said beam axis.

4. A surface ionization source according to claim 3 wherein said glass bead includes one of sodium or potassium.

5. A surface ionization source according to claim 4 including an insulating ceramic ring engaged to said housing and extending around said surface, said ring being engaged against said extraction plate for closing said surface and for insulating said extraction plate from said housing.

* * * * *